United States Patent [19]

Grassy et al.

[11] 4,105,993
[45] Aug. 8, 1978

[54] METHOD FOR DETERMINING ELASTIC CONSTANTS OF GEOLOGICAL FORMATIONS

[75] Inventors: Robert Grassy, Bouvron; Dominique Apert, Blain; Arnaud Etchecopar, Montpellier, all of France

[73] Assignee: Services et Instruments de Geophysique, Bouvron, France

[21] Appl. No.: 720,700

[22] Filed: Sep. 7, 1976

[30] Foreign Application Priority Data

Sep. 9, 1975 [FR] France ............................ 75 27594

[51] Int. Cl.$^2$ ..................... G01V 1/22; G01V 1/28
[52] U.S. Cl. ................. 340/15.5 CP; 340/15.5 TN; 340/15.5 SW
[58] Field of Search ............ 340/15.5 BH, 15.5 TN, 340/15.5 CP, 15.5 SW; 181/102, 105, 106; 175/45; 73/151; 33/304; 343/112 D

[56] References Cited

U.S. PATENT DOCUMENTS

| | | | |
|---|---|---|---|
| Re. 18,565 | 8/1932 | Rosaire | 181/105 |
| 2,062,151 | 11/1936 | Weatherby | 340/15.5 BH |
| 2,276,335 | 3/1942 | Peterson | 340/15.5 TC |
| 3,208,549 | 9/1965 | Alexander et al. | 340/15.5 SW |
| 3,876,016 | 4/1975 | Stinson | 340/15.5 CP |
| 3,962,674 | 6/1976 | Howell | 340/15.5 TN |
| 3,979,724 | 9/1976 | Silverman et al. | 340/15.5 BH |
| 3,993,974 | 11/1976 | Silverman et al. | 181/102X |
| 4,003,017 | 1/1977 | Bailey | 340/15.5 BH |

OTHER PUBLICATIONS

*Geophysical Prospecting,* vol. 23, No. 1, Mar. 1975, pp. 53–55, D.M. McCann et al., "Inter-Borehole Acoustic Measurements and Their Use in Engineering Geology".

*Primary Examiner*—Maynard R. Wilbur
*Assistant Examiner*—Lawrence Goodwin
*Attorney, Agent, or Firm*—Littlepage, Quaintance, Murphy, Richardson and Webner

[57] ABSTRACT

The present invention relates to a method of determining the "P" and "S" wave propagation velocities and the Young's modulus and Poisson's ratio in geological formations. An acoustic transmitter is placed in a borehole, and receivers in another borehole at predetermined heights. The differences in the propagation times of "P" waves and the exact distance between receivers and transmitter enable the velocities of the "P" and "S" waves to be obtained with sufficient accuracy to calculate the constants. The invention is useful in civil engineering.

10 Claims, 3 Drawing Figures

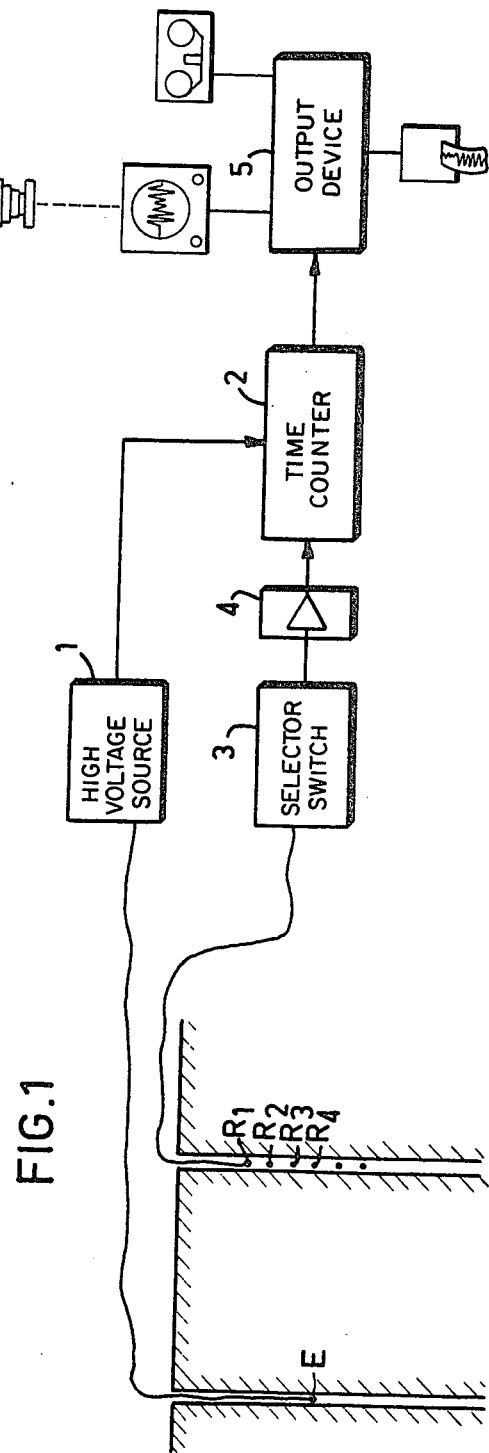
FIG.1
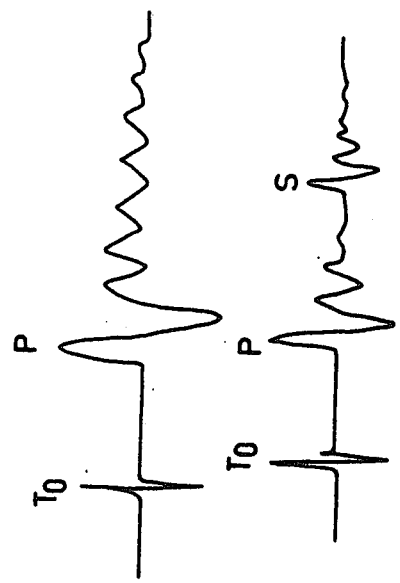
FIG.2A
FIG.2B

METHOD FOR DETERMINING ELASTIC CONSTANTS OF GEOLOGICAL FORMATIONS

The present invention relates to a method for determining "P" and "S" wave propagation velocities and Young's modulus and Poisson's ratio in geological formations.

Geophysical survey methods are concerned with the relative or absolute determination of the physical parameters of subterranean formations, whether experience has shown that these parameters have a direct relationship with the object of the investigation, or that this relationship is indirect. The latter case is most frequent: for example, a variation in the velocity of sound propagation, in electrical resistivity, in magnetic properties, etc.. may have a relationship with a variation in permeability capable of interesting prospectors for petroleum, water or steam.

Among the cases where geophysical methods can supply a useful parameter directly, may be mentioned the determination of the elastic constants of formations (Young's modulus and Poisson's ratio) which are of interest in civil engineering: construction of foundations, tunneling, highway cuttings etc.

The following relationships are known to hold between the velocities of propagation of elastic waves in a formation, its density and its dynamic elastic moduli:

$$V_P^2 = \frac{E \times CU}{\rho} \quad \text{and}$$

$$V_S^2 = \frac{G}{\rho}$$

where $V_P$ and $V_S$ denote the velocities of propagation in the material, respectively of the "P" or longitudinal waves, corresponding to the propagation of a compressive stress and of the "S" or transverse waves, corresponding to the propagation of a shear stress, E, the dynamic elastic modulus under compression (Young's modulus). CU, a function of Poisson's ratio u: CU = $1-u/(1+u)(1-2u)$
$\rho$, the density of the material
$\rho$ = specific gravity/acceleration due to gravity
G, the dynamic elastic modulus under shear.

It is recalled that Poisson's ratio u, which is the ratio of longitudinal and lateral deformation, varies from 0.1 to 0.5, 0.5 coresponding to an incompressible material.

It is also recalled that
G = E/2 (1=u)

It is seen that it is possible to know by calculation the values of the elastic constants from the propagation velocities.

Methods of measuring such propagation velocities are known. For example, in the article of Mc Cann et al "Inter-borehole accoustic measurements and their use in engineering geology" which appears in "Geophysical Prospecting", May 1975, is to be found a description of investigations carried out by the so-called "Inter-borehole" technique and which have enabled interfaces or faults to be traced based on the differences of "P" wave propagation velocities in various levels. A similar method has already been described in U.S. Pat. No. 2,276,335 of Raymond A. Peterson, published 17 March, 1942.

The "inter-borehole" technique consists of placing the sound source and the detector in two neighbouring boreholes, preferably at depths such that they are within the same horizon.

The sound is advantageously constituted by an electric spark transmitter, which enables the difficulties and restrictions involved in the use of explosives to be avoided.

Of course, the propagation velocity of "S" waves is slower than that of "P" waves and necessitates a well-designed receiver.

On the other hand, the calculation of the moduli requires a very accurate knowledge of the distance between transmitter and receiver, and the deviation from verticality of boreholes is often too great for this distance to be considered as equal to the distance between these boreholes at the surface, so that it would be necessary to have recourse to expensive deflection measurements if a greater accuracy than 15 to 20% is desired.

In U.S. Pat. No. 3,127,950 of Oswald A. Itria, published Apr., 7, 1964, the difficulty is overcome by placing the receiver and the transmitter in the same drill hole. The distance between these is then known with accuracy, but on the one hand it becomes necessary to eliminate interfering signals transmitted through the piping and/or the water in the drill hole, and on the other hand the information that can be derived therefrom is limited to the formations located in the immediate vicinity of the drill hole, which necessitates a plurality of drill holes.

It is an object of the present invention to overcome these drawbacks and to provide a simple and practical method for the determination of the absolute velocities of "P" and "S" wave propagation.

The method according to the invention consists of arranging, in the borehole serving for the reception, not only a single receiver, but a series of receivers sensitive to the "P" waves placed at known distances, one above the other, one of them at least being arranged so as to be capable of receiving "P" and "S" waves and the others being capable of receiving "P" waves, and of transmitting two signals, by means of the transmitter, one of these signals being relatively strong and the second weaker. The first signal is designed to be received by all the receivers and the second is only received by the receiver sensitive to both "P" and "S" waves.

Knowing the propagation time of the first signal to the various receivers with suitable accuracy, the strength of the signal being sufficient to obtain distinct pulses, it is easy to deduce therefrom the average propagation velocity of the "P" wave and the distances which separate the transmitter from the receivers and, in particular, from that which must receive the "P" and "S" waves corresponding to the second signal.

This signal is weaker so that the disturbance caused by the "P" signal is sufficiently attenuated for the "S" signal which then arrives, to be received under the best conditions.

Of course, the terms "first signal" and "second signal" do not correspond to an obligatory time sequence, and the second signal can indeed be transmitted before the first.

The invention will now be described in more detail, purely by way of non-limiting illustration, with reference to the accompanying drawings, in which:

FIG. 1 is an overall diagram of one embodiment of a device for practising the method according to the invention, given by way of non-limiting example.

FIGS. 2A and 2B show the signals received by a visual recorder connected to the transmitter and to the receivers.

The device comprises a transmitter E positioned in a first borehole and a series of receivers R1, R2, R3, R4 ... positioned in a second borehole.

The transmitter E is a conventional type spark transmitter, similar to the transmitter disclosed in the cited article in Geophysical Prospecting, May 1975, comprising two high voltage electrodes placed in a weighted container filled with liquid (salt water for example). This container is lowered to the appropriate depth in the borehole, it is filled with water, or, if it is above the hydrostatic level, with a bentonite mud or the like.

The transmitter E is connected by coaxial cable to a high voltage electrical source 1.

The receivers are of the "hydrophone" type comprising, for example, a weighted container, filled with oil, in which a piezoelectric pellet is placed. They are immersed, at well-known depth, in the second borehole filled, like the first, with water or with bentonite.

They are connected to an electronic time counter 2, with an accuracy of the order of a microsecond, through a selector switch 3 and an amplifier 4. In FIG. 1, only one connection between receiver and selector switch is shown. The time counter 2 is also connected to the source 1, whence it receives a starting signal at the moment $T_o$ of the emission of the spark.

A digital print-out device 5 enables a table to be obtained of the propagation times of the signal "P" to the different receivers, or the propagation times of the signals "P" and "S" to the same receiver.

The print-out device 5 may be replaced or supplemented by an oscilloscope, if necessary itself supplemented by a photographic recording device. It can also be replaced or supplemented by a tape recording device.

It is also possible to provide a computing device giving the values of the Young's modulus and the Poisson's ratio directly, and/or the propagation velocities.

If it is assumed that the wave propagation velocities in the formation concerned, are the same in the vertical and horizontal directions, the calculation of the distance between the two boreholes, at the level of the transmitter, is very simple.

Let $R_A$ be the receiver located closest to the transmitter E (that is to say, that which is reached first by the wave) and $R_B$ another receiver situated in the same borehole, and $t_A$ and $t_B$ the corresponding propagation times. The distance D between boreholes is given as a function of the distance $d$ between $R_A$ and $R_B$ by $$D = d\, t_A / \sqrt{t_B^2 - t_A^2}$$

If the formation cannot be considered as isotropic, it is obviously necessary to use a somewhat more complex calculation, which remains nonetheless within the scope of the technician.

Having now particularly described and ascertained the nature of our said invention and in what manner the same is to be performed, we declare that what we claim is:

1. A method for determining the wave propagation velocities of "P" waves and "S" waves through a geological formation from a first bore hole to a second bore hole, the method comprising the steps of:
   (a) positioning in the first bore hole a single transmitter for transmitting both "P" and "S" waves,
   (b) positioning in the second bore hole a series of receivers for receiving "P" waves, at least one of said receivers being arranged to also receive "S" waves, the receivers being positioned in vertical arrangement at known distances from each other,
   (c) transmitting at least one "P" wave from the transmitter and measuring the time for propagation of the "P" wave from the transmitter to each receiver,
   (d) calculating the distance between the transmitter and the at least one receiver arranged to also receive "S" waves,
   (e) transmitting at least one "S" wave from the transmitter and measuring the time for propagation of the "S" wave from the transmitter to the at least one receiver arranged to also receive "S" waves, and
   (f) calculating the propagation velocities of the "P" and "S" waves.

2. The method of claim 1 where in Steps (c) and (e) the transmitter emits a first signal for determining the "P" wave propagation velocity and a second signal weaker than the first signal for determining the "S" wave propagation velocity.

3. The method of claim 1 further comprising the step of digitally printing a table of the propagation times of the "P" waves to the receivers.

4. The method of claim 1 further comprising the step of digitally printing a table of the propagation times of the "P" and "S" waves to said at least one receiver.

5. The method of claim 1 further comprising the step of displaying the signal received at said at least one receiver on an oscilloscope.

6. The method of claim 5 further comprising the step of photographically recording the displayed signal.

7. The method of claim 1 further comprising the step of magnetically recording the signal received at said at least one receiver on a tape recorder.

8. The method of claim 1 further comprising the step of computing the Young's modulus and the Poisson's ratio of the geological formation.

9. The method of claim 1 where in Step (b) a portion of said series of receivers is positioned above, while the remaining portion of said series of receivers is positioned below, the horizontal plane in which the transmitter is positioned.

10. A method for determining the Young's modulus and Poisson's ratio of a geological formation between a first bore hole and a second bore hole, the method comprising the steps of:
   (a) positioning in the first bore hole a single transmitter for transmitting both "P" and "S" waves,
   (b) positioning in the second bore hole a series of receivers for receiving "P" waves, at least one of said receivers being arranged to also receive "S" waves, the receivers being positioned in vertical arrangement at known distances from each other, a portion of the series of receivers being positioned above, and the remaining portion of the series being positioned below, a horizontal plane in which the transmitter is positioned,
   (c) transmitting a first signal from the transmitter and measuring the time for propagation of a "P" wave from the transmitter to each receiver,
   (d) calculating the distance between the transmitter and the at least receiver arranged to also receive "S" waves, (e) transmitting a second signal, weaker than the first signal, and measuring the time for propagation of an "S" wave from the transmitter to the at least one receiver arranged to also receive "S" waves, (f) calculating the propagation velocities of the "P" and "S" waves, and (g) computing the Young's modulus and the Poisson's ratio of the geological formation.

* * * * *